United States Patent
Takahashi

[11] Patent Number: 5,751,494
[45] Date of Patent: May 12, 1998

[54] IMAGE DISPLAY APPARATUS

[75] Inventor: Koichi Takahashi, Hachioji, Japan

[73] Assignee: Olympus Optical., Ltd., Tokyo, Japan

[21] Appl. No.: 768,583

[22] Filed: Dec. 18, 1996

[30] Foreign Application Priority Data

Dec. 18, 1995 [JP] Japan .................................. 7-329044

[51] Int. Cl.⁶ .................................................. G02B 27/14
[52] U.S. Cl. ........................... 359/631; 359/633; 359/630
[58] Field of Search ............................. 359/631, 630, 359/633, 637, 636; 345/7, 8, 9

[56] References Cited

U.S. PATENT DOCUMENTS

| | | | |
|---|---|---|---|
| 2,336,508 | 12/1943 | Smith et al. | 359/633 |
| 5,157,503 | 10/1992 | Dugdale | 358/238 |
| 5,189,452 | 2/1993 | Hodson et al. | 353/94 |
| 5,198,928 | 3/1993 | Chauvin | 359/465 |
| 5,299,063 | 3/1994 | Fritz et al. | 359/631 |
| 5,334,991 | 8/1994 | Wells et al. | 345/8 |
| 5,384,654 | 1/1995 | Iba | 359/364 |

FOREIGN PATENT DOCUMENTS 6-308425  11/1994  Japan .
7-79393   3/1995   Japan .

*Primary Examiner*—David C. Nelms
*Assistant Examiner*—Ricky Mack
*Attorney, Agent, or Firm*—Cushman, Darby & Cushman IP Group of Pillsbury, Madison & Sutro LLP

[57] ABSTRACT

A head-mounted image display apparatus which uses two or more image display devices, and which is compact and lightweight and yet enables observation of a clear image over the entire observation image field at a wide field angle and high resolution. The image display apparatus includes two image display devices (5 and 6) and two ocular optical systems (3 and 4) for projecting, respectively, images formed by the two image display devices (5 and 6) as enlarged virtual images in front of one common eyeball (7) of an observer and for leading the projected images to the eyeball (7). When the two ocular optical systems are defined as a first ocular optical system (3) and a second ocular optical system (4) in order from the observer side, the first and second ocular optical systems (3 and 4) have concave mirrors (12 and 22), respectively. These reflecting surfaces are tilted or decentered with respect to an observer's visual axis (2). The concave mirror 12 of the first ocular optical system (3) is a semitransparent surface. The first ocular optical system (3) is disposed on the eyeball side of the second ocular optical system (4) in the direction of the observer's visual axis (2), and the second ocular optical system (4) is disposed on the side of the first ocular optical system (3) which is remote from the eyeball (7) in the observer's visual axis direction.

26 Claims, 9 Drawing Sheets

IMAGE DISPLAY APPARATUS

BACKGROUND OF THE INVENTION

The present invention relates to an image display apparatus and, more particularly, to a head- or face-mounted image display apparatus which is compact and lightweight and yet enables observation of an image at high resolution.

In recent years, helmet- and goggle-type head- or face-mounted image display apparatuses have been developed for virtual reality or for the purpose of enabling the user to enjoy a wide-screen image personally. This type of image display apparatus needs to be fitted to an observer's head when the observer performs observation. Therefore, the image display apparatus must be compact and lightweight in order to minimize the physical load imposed on the observer; this is an important condition for the image display apparatus. On the other hand, as the observation field angle becomes wider, the size of the image field for observation increases, and the observer can enjoy watching images of enhanced dynamic presence in an even more absorbed state. Accordingly, it is an important condition for the image display apparatus that it should present a wide field angle.

A conventional image display apparatus designed to realize a wide field angle is disclosed in U.S. Pat. No. 5,157,503. This is an image display apparatus of the type wherein two or more image display devices are combined together to widen the observation field angle.

Another conventional image display apparatus is disclosed in Japanese Patent Application Unexamined Publication (KOKAI) No. 6-308425. This is an image display apparatus of the type wherein two or more image display devices are combined together, and an ocular optical system is formed by using a convex lens.

There is another type of conventional image display apparatus wherein two small-sized display devices are disposed side-by-side, and images of these display devices are combined into a single composite image by half-mirrors combined in the shape of a V to thereby widen the observation field angle, as in the prior application [Japanese Patent Application Unexamined Publication (KOKAI) No. 7-79393] by the present applicant.

However, the image display apparatus disclosed in U.S. Pat. No. 5,157,503 is not so compact and lightweight as it can be fitted to an observer's head.

The image display apparatus disclosed in Japanese Patent Application Unexamined Publication (KOKAI) No. 6-308425 suffers from the problem that the boundary between the two images is likely to be visible because the two image display devices are merely disposed side-by-side horizontally with respect to the observer's visual axis. When the observer's eyeball position is off the set position, the boundary area is seen to be particularly large. Consequently, the observer undesirably sees two parted images. Usually, the observer's interpupillary distance varies widely from person to person. Therefore, all observers cannot stably observe the displayed image.

In the prior application [Japanese Patent Application Unexamined Publication (KOKAI) No. 7-79393] by the present applicant, there is a junction (edge) between the two half-mirrors for connecting the images of the two image display devices. Therefore, it is likely that the image will become dark or cut in the vicinity of the center of the image field.

SUMMARY OF THE INVENTION

In view of the above-described problems of the conventional techniques, an object of the present invention is to provide an image display apparatus suitable for use as a head-mounted image display apparatus which uses two or more image display devices, and which is compact and lightweight and yet enables observation of a clear image over the entire observation image field at a wide field angle and high resolution.

Another object of the present invention is to provide an image display apparatus suitable for use as a head-mounted image display apparatus which uses two or more image display devices, and which is compact and lightweight and yet makes it possible to observe the image display devices at a wide field angle and high resolution and also makes it possible to observe images of the image display devices and an image of an external scene simultaneously or singly without using a special optical element other than an optical element constituting an ocular optical system.

Still another object of the present invention is to provide an image display apparatus suitable for use as a head-mounted image display apparatus which uses two or more image display devices, and which is compact and lightweight and yet makes it possible to observe the image display devices at a wide field angle and high resolution and also makes it possible to observe images of the image display devices and an image of an external scene selectively without using a special optical element other than an optical element constituting an ocular optical system.

To attain the above-described objects, the present invention provides a first image display apparatus which includes at least two image display devices for displaying images, and at least two ocular optical systems for projecting, respectively, the images formed by the at least two image display devices as enlarged virtual images in front of one common eyeball of an observer and for leading the projected images to the eyeball. When the at least two ocular optical systems are defined as a first ocular optical system and a second ocular optical system in order from the observer side, the first and second ocular optical systems each have at least one reflecting surface of positive power. The reflecting surface is tilted or decentered with respect to an observer's visual axis. The at least one reflecting surface of positive power in the first ocular optical system is a semitransparent surface which reflects a part of incident light and transmits a part of it. The first and second ocular optical systems are disposed in series in the direction of the observer's visual axis such that the first ocular optical system is disposed on the eyeball side of the second ocular optical system, and the second ocular optical system is disposed on the side of the first ocular optical system which is remote from the eyeball.

In addition, the present invention provides a second image display apparatus which includes at least two image display devices for displaying images, and at least two ocular optical systems for projecting, respectively, the images formed by the at least two image display devices as enlarged virtual images in front of one common eyeball of an observer and for leading the projected images to the eyeball. When the at least two ocular optical systems are defined as a first ocular optical system and a second ocular optical system in order from the observer side, the first and second ocular optical systems each have at least one reflecting surface of positive power. The reflecting surface is tilted or decentered with respect to an observer's visual axis. The at least one reflecting surface of positive power in each ocular optical system is a semitransparent surface which reflects a part of incident light and transmits a part of it. The first and second ocular optical systems are disposed in series in the direction of the observer's visual axis such that the first ocular optical system is disposed on the eyeball side of the second ocular optical system, and the second ocular optical system is disposed on the side of the first ocular optical system which is remote from the eyeball. Moreover, in a superimposition area, a bundle of light rays incident from an external scene passes successively through the second ocular optical system and the first ocular optical system to reach the observer's eyeball.

In addition, the present invention provides a third image display apparatus which includes at least two image display devices for displaying images, and at least two ocular optical systems for projecting, respectively, the images formed by the at least two image display devices as enlarged virtual images in front of one common eyeball of an observer and for leading the projected images to the eyeball. When the at least two ocular optical systems are defined as a first ocular optical system and a second ocular optical system in order from the observer side, the first and second ocular optical systems each have at least one reflecting surface of positive power. The reflecting surface is tilted or decentered with respect to an observer's visual axis. The at least one reflecting surface of positive power in each ocular optical system is a semitransparent surface which reflects a part of incident light and transmits a part of it. In a first position, the first and second ocular optical systems are disposed side-by-side in a direction perpendicular to the observer's visual axis. In a second position, the first and second ocular optical systems are disposed in series in the direction of the observer's visual axis such that the first ocular optical system is disposed on the eyeball side of the second ocular optical system, and the second ocular optical system is disposed on the side of the first ocular optical system which is remote from the eyeball. Moreover, in a superimposition area, a bundle of light rays incident from an external scene passes successively through the second ocular optical system and the first ocular optical system to reach the observer's eyeball.

The reasons for adopting the above-described arrangements in the present invention, together with the functions thereof, will be explained below.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF THE PREFERRED EMBODIMENTS

To ensure a wide field angle for observation, it is conceivable to use a large-sized image display device. However, in the case of an image display apparatus which is fitted to a human head when used for observation as in the present invention, the weight of the apparatus strongly influences the physical load imposed on the observer. That is, a large and heavy image display apparatus imposes a heavy load on the observer. Therefore, the observer cannot wear it for a long period of time, or it is difficult for the observer to move his/her body with the apparatus fitted thereto.

The first image display apparatus according to the present invention is an image display apparatus which includes at least two image display devices for displaying images, and at least two ocular optical systems for projecting, respectively, the images formed by the at least two image display devices as enlarged virtual images in front of one common eyeball of an observer and for leading the projected images to the eyeball. When the at least two ocular optical systems are defined as a first ocular optical system and a second ocular optical system in order from the observer side, the first and second ocular optical systems each have at least one reflecting surface of positive power.

The reflecting surface is tilted or decentered with respect to an observer's visual axis. The at least one reflecting surface of positive power in the first ocular optical system is a semitransparent surface which reflects a part of incident light and transmits a part of it. The first and second ocular optical systems are disposed in series in the direction of the observer's visual axis such that the first ocular optical system is disposed on the eyeball side of the second ocular optical system, and the second ocular optical system is disposed on the side of the first ocular optical system which is remote from the eyeball. By virtue of this arrangement, it becomes possible to enlarge the observation field angle. Further, the arrangement provides such an image for observation that the observer cannot recognize the joint between the images of the two image display devices, which are combined together into a composite image. Therefore, it is possible to give enhanced dynamic presence and successfully provide the observer with a clear image for observation despite a wide image field.

The present invention will be described below more specifically with reference to FIGS. 1(a) and 1(b).

Figure 1A:
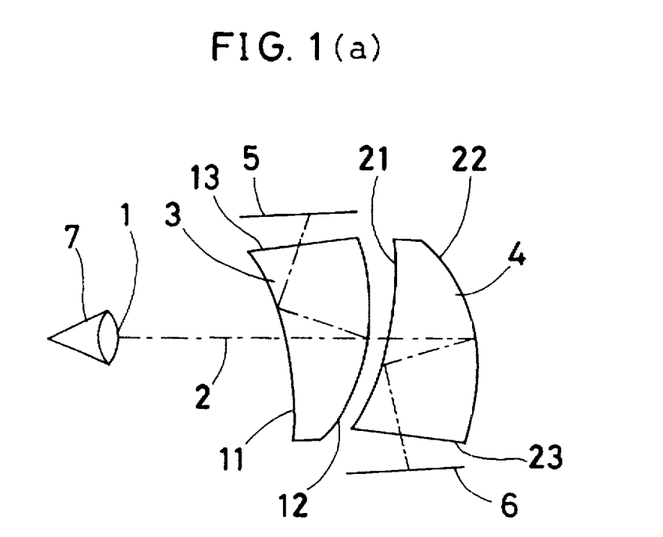
FIGS. 1(a) and 1(b) are diagrams for describing the arrangement and operation of a first image display apparatus according to the present invention.
Figure 1B:
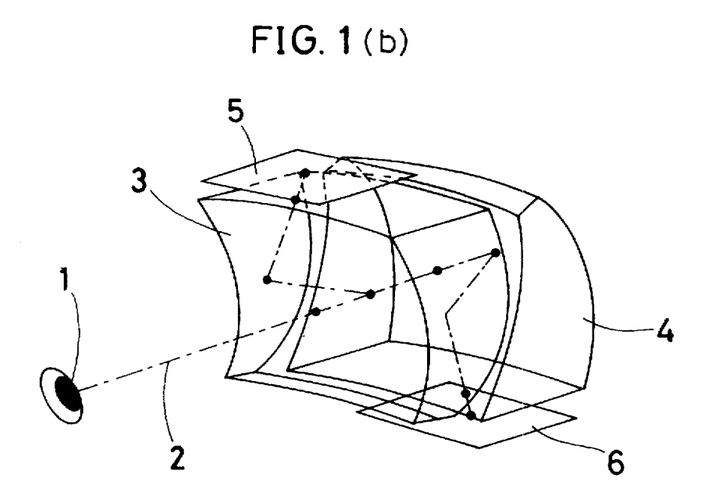

FIG. 1(a) is a side view of an image display apparatus according to the present invention, and FIG. 1(b) is a perspective view of the image display apparatus according to the present invention as seen from the observer side. In these figures, reference numeral 1 denotes the pupil position of one eye of an observer; 2 is an observer's visual axis; 3 is a first ocular optical system; 4 is a second ocular optical system; 5 is a first image display device; 6 is a second image display device; 7 is one eyeball of an observer; 11 is a first surface of the first ocular optical system 3; 12 is a second surface of positive power in the first ocular optical system 3, which is a semitransparent surface; 13 is a third surface of the first ocular optical system 3; 21 is a first surface of the second ocular optical system 4; 22 is a second surface of the second ocular optical system 4, which is a reflecting surface of positive power; and 23 is a third surface of the second ocular optical system 4.

The path of light rays in a case where an image of the first image display device 5 is observed through the first ocular optical system 3 will be described below. Light emitted from the first image display device 5 enters the first ocular optical system 3 through the third surface 13 and is totally reflected by the first surface 11 and then reflected by the second surface 12. The reflected light passes through the first surface 11 and enters the observer's eyeball 7 with the observer's pupil 1 as an exit pupil.

The path of light rays in a case where an image of the second image display device 6 is observed through the second ocular optical system 4 will be described below. Light emitted from the second image display device 6 enters the second ocular optical system 4 through the third surface 23 and is totally reflected by the first surface 21 and then reflected by the second surface 22. The reflected light passes through the first surface 21 and further passes successively through the second surface 12 and first surface 11 of the first ocular optical system 3 to enter the observer's eyeball 7 with the observer's pupil 1 as an exit pupil.

In this way, the images of the two image display devices 5 and 6 are projected into one eyeball 7 of the observer as enlarged virtual images, and the two images are combined into one composite image. Thus, it is possible to realize an observation image of wide field angle.

With the conventional technique of observing two image display devices, the joint between optical systems corresponding to the two image display devices is undesirably left in the center of the image for observation.

In the image display apparatus according to the present invention, however, the two ocular optical systems 3 and 4 are disposed in series in the direction of the observer's visual axis 2. Therefore, when observation images formed by the first and second ocular optical systems 3 and 4 are combined together, the resulting composite image for observation has no joint. Accordingly, the observer can view a natural image at a wide field angle without feeling a sense of incongruity.

In the above-described arrangement, the optical path can be folded in each ocular optical system by forming the ocular optical system from a prism member comprising at least three surfaces tilted or decentered with respect to the observer's visual axis. That is, the first ocular optical system 3 is formed by using a prism member which has the first surface 11, the second surface 12 and the third surface 13, which are tilted or decentered with respect to the observer's visual axis 2, and in which the space surrounded by the three surfaces is filled with a transparent medium having a refractive index larger than 1. The second ocular optical system 4 is also formed by using a prism member which has the first surface 21, the second surface 22 and the third surface 23, which are tilted or decentered with respect to the observer's visual axis 2, and in which the space surrounded by the three surfaces is filled with a transparent medium having a refractive index larger than 1. By doing so, the optical path can be folded in each ocular optical system, and moreover, the air-reduced length shortens. Accordingly, it is possible to make the apparatus more compact. At the same time, the number of components reduces, the structure is simplified, and the production of the apparatus is facilitated. Consequently, it becomes possible to reduce the cost of the apparatus.

Further, it is advantageous from the viewpoint of the arrangement of the apparatus that the first image display device 5 and the second image display device 6 face in respective directions different from each other. If the two image display devices are disposed on the same side so as to face in the same direction, the two image display devices may interfere with each other. Particularly, in a case where each image display device needs to provide a backlight and a driver circuit board in the vicinity of the display device as in an LOD (Liquid Crystal Display), these associated parts are, in many cases, larger than the display surface; therefore, there is likelihood that the two image display devices will interfere with each other, making it difficult to fit the apparatus to the observer's head. For this reason, the first and second image display devices 5 and 6 are disposed as shown in FIGS. 1(a) and 1(b), for example. That is, the first image display device 5 is disposed above the first ocular optical system 3, with its display surface directed downward as viewed in the figures, and the second image display device 6 is disposed below the second ocular optical system 4, with its display surface directed upward as viewed in the figures. With this arrangement, it becomes possible to avoid interference between the two image display devices or their peripheral devices.

Incidentally, it is preferable from the viewpoint of effectively correcting aberrations that at least one of the three surfaces constituting the prism member, preferably the reflecting surface, should be an aspherical surface. This is an important condition for correcting comatic aberrations, particularly higher-order comatic aberrations and coma flare, produced by the reflecting surface, which is decentered or tilted with respect to the visual axis.

In an image display apparatus which uses an ocular optical system of the type having a decentered or tilted reflecting surface in front of an observer's eyeball as in the present invention, light rays are obliquely incident on the reflecting surface even on the visual axis. Therefore, complicated comatic aberration is produced at the central axis of the reflecting mirror. The complicated comatic aberration increases as the tilt angle of the reflecting surface becomes larger. However, if it is intended to realize a compact and wide-field image display apparatus, it is difficult to ensure an observation image of wide field angle unless the amount of eccentricity (displacement) or the tilt angle is increased to a certain extent because of the interference between the image display device and the optical path. Accordingly, as the field angle of an image display apparatus becomes wider and the size thereof becomes smaller, the tilt angle of the reflecting surface becomes larger. As a result, how to correct higher-order comatic aberrations becomes a serious problem. To correct such complicated comatic aberrations, at least one of the surfaces constituting the ocular optical system, preferably the reflecting surface, is formed into a decentered aspherical surface. By doing so, the power of the optical system can be made asymmetric with respect to the visual axis. Further, the effect of the aspherical surface can be utilized for off-axis aberration. Accordingly, it becomes possible to effectively correct comatic aberrations, including axial aberration.

Further, it is preferable from the viewpoint of effectively correcting aberrations that the at least one of the three surfaces constituting the prism member should be an anamorphic surface. That is, the at least one of the three surfaces should be a surface in which the radius of curvature in a YZ-plane and the radius of curvature in an XZ-plane, which perpendicularly intersects the YZ-plane, are different from each other in a coordinate system defined, as described later, such that the direction of the observer's visual axis is taken as a Z-axis, where the direction toward the ocular optical system from the origin is defined as a positive direction; the vertical direction (as viewed from the observer's eyeball) which perpendicularly intersects the observer's visual axis is taken as a Y-axis, where the upward direction is defined as a position direction; and the horizontal direction (as viewed from the observer's eyeball) which perpendicularly intersects the observer's visual axis is taken as an X-axis, where the leftward direction is defined as a positive direction.

This is a condition for correcting aberrations which occur because the reflecting surface is decentered or tilted with respect to the visual axis. In general, if a spherical surface is decentered, the curvature relative to light rays incident on the surface in the plane of incidence and that in a plane perpendicularly intersecting the incidence plane differ from each other. Therefore, in an ocular optical system where a reflecting surface is disposed in front of an observer's eyeball in such a manner as to be decentered or tilted with respect to the visual axis as in the present invention, an image on the visual axis lying in the center of the observation image is also astigmatically aberrated for the reason stated above. In order to correct the axial astigmatic aberrations, it is important that at least one of the three surfaces constituting the prism member, preferably, the reflecting surface, should be formed so that the radius of curvature in the plane of incidence and that in a plane perpendicularly intersecting the incidence plane are different from each other.

If the at least one of the three surfaces constituting the prism member is a three-dimensional free surface, it is possible to satisfy the condition for obtaining the above described effect produced by an aspherical surface or an anamorphic surface, and hence possible to effectively correct aberrations produced in the ocular optical system.

Here, the three-dimensional free surface is a curved surface expressed by $$z = \sum_{n=0}^{k} \sum_{m=0}^{k'} C_{nm} x^m y^{n-m} \quad (1)$$

where x, y and z denote orthogonal coordinates, $C_{nm}$ is an arbitrary coefficient, and k and k' are also arbitrary values, respectively. If the observation images formed by the two ocular optical systems are combined together such that the resulting composite image has an overlap area where the two observation images are superimposed on one another, it is possible to prevent the observer from failing to see an image in the area of joint between the two observation images when the observer's visual axis is not coincident with the visual axis of the image display apparatus on account of such a problem that the apparatus is not favorably fitted to the observer's head.

Moreover, because one image is produced by using two image display devices, the number of effective pixels is approximately double the number of pixels of one image display device. Accordingly, the resolution can be effectively increased. In particular, the resolution can be increased even more effectively if the above-described overlap area is disposed such that when the two images are combined at the second surface of the first ocular optical system, the pixels of the two image display devices are displayed to be displaced relative to each other by a half pitch.

Next, the second image display apparatus according to the present invention will be described with regard to only portions in which it is different from the first image display apparatus. When the at least two ocular optical systems are defined as a first ocular optical system and a second ocular optical system in order from the observer side, the first and second ocular optical systems each have at least one reflecting surface of positive power. The reflecting surface is a semitransparent surface which reflects a part of incident light and transmits a part of it. In a superimposition area, a bundle of light rays incident from an external scene passes successively through the second ocular optical system and the first ocular optical system to reach the observer's eyeball. Thus, regarding the images of the image display devices, it becomes possible to widen the horizontal observation field angle as in the case of the first image display apparatus. Moreover, because the apparatus provides such an image for observation that the observer cannot recognize the joint between the images of the two image display devices, which are combined together into a composite image, it is possible to provide a wide image field that can give enhanced dynamic presence, and it is possible to provide the observer with a clear image for observation. Further, the second image display apparatus enables observation of an image of an external scene. Alternatively, it is possible to observe both an image of an external scene and an electronic image (i.e. an image of an image display device) which are superimposed on one another.

The second image display apparatus will be described below with reference to FIGS. 2(a), 2(b) and 2(c). In these figures, the same members or portions as those in FIGS. 1(a) and 1(b) are denoted by the same reference numerals. The second surface 22 of the second ocular optical system 4 is a semitransparent surface. Therefore, in FIG. 2(b), a bundle of light rays from a right-hand external scene first enters the second surface 22 of the second ocular optical system 4 and passes through the first surface 21 thereof to enter the second surface 12 of the first ocular optical system 3. Then, the ray bundle passes through the first surface 11 of the first ocular optical system 3 to enter the observer's pupil 1. Thus, the observer can recognize an image of the external scene.

Figure 2A:
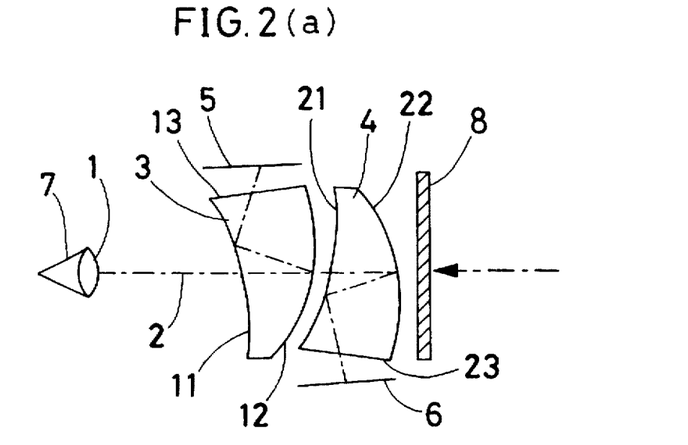
FIGS. 2(a), 2(b) and 2(c) are diagrams for describing the arrangement and operation of a second image display apparatus according to the present invention.
Figure 2B:
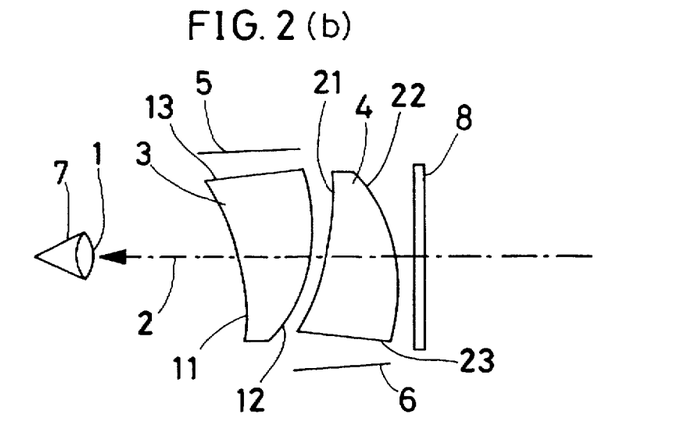
Figure 2C:
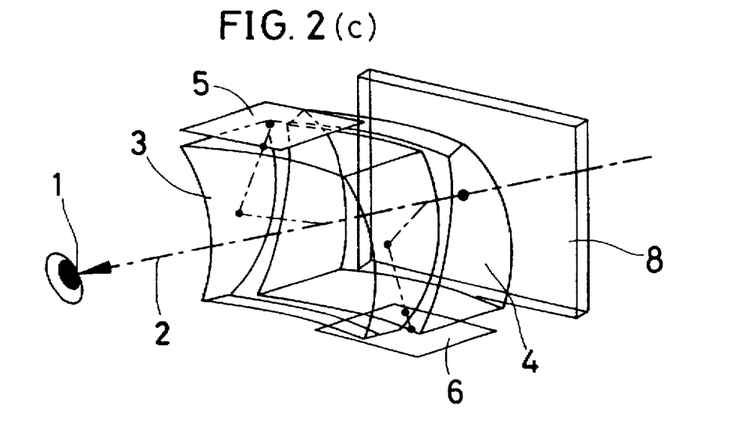

As shown in FIGS. 2(a), 2(b) and 2(c), a light-blocking device 8, such as a liquid crystal shutter, is disposed on the side of the composite ocular optical system which is remote from the eyeball 7. To observe only an image of an external scene, the image display devices 5 and 6 are turned off, and the light-blocking device 8 is placed in the light transmitting mode. To observe both an electronic image and an external-scene image which are superimposed on one another, as shown in FIG. 2(c), the image display devices 5 and 6 are turned on to display images, and the light-blocking device 8 is placed in the light-transmitting mode. To observe only the electronic image, as shown in FIG. 2(a), the light-blocking device 8 is placed in the light-blocking mode. Thus, the images of the image display devices 5 and 6 can be observed superimposed on one another as in the case of FIGS. 1(a) and 1(b).

In the above-described arrangement, it is preferable that the composite power (refracting power) of the first and second ocular optical systems 3 and 4 should be approximately zero for a bundle of light rays entering the image display apparatus from an external scene and reaching the observer's eyeball 7. With this arrangement, a ray bundle from an external scene is incident on the observer's pupil 1 as a bundle of approximately parallel rays. Therefore, a clear external-scene image can be observed.

It is preferable in the second image display apparatus also that the at least two ocular optical systems should be each formed from a prism member comprising at least three surfaces tilted or decentered with respect to the observer's visual axis as in the case of the first image display apparatus. It is also preferable for the at least two image display devices to be disposed to face in respective directions different from each other. Further, it is preferable that at least one reflecting surface of each ocular optical system should be an aspherical surface, an anamorphic surface, or a three-dimensional free surface.

In the second image display apparatus, it is important to dispose a light-blocking device on the side of the two ocular optical systems which is remote from the observer in order to image from one to another. When image and an electronic image from one to another. When it is not desired to observe an external-scene image, light from the external scene must be prevented from entering the apparatus by using a light-blocking device. If no light-blocking device were used, the external light would always enter the eyeball, making it impossible to observe an electronic image of high contrast. Conversely, when it is desired to observe only an external-scene image, the image display devices are stopped from displaying images, and the light-blocking device is placed in the light-transmitting mode.

In the third image display apparatus according to the present invention, all or one of at least two ocular optical systems is adapted to be movable so that the ocular optical systems align with each other in the direction of the observer's visual axis, thereby enabling the observer to view an image of an external scene. The third image display apparatus will be described below with reference to FIGS. 3(a), 3(b) and 3(c).

Figure 3A:
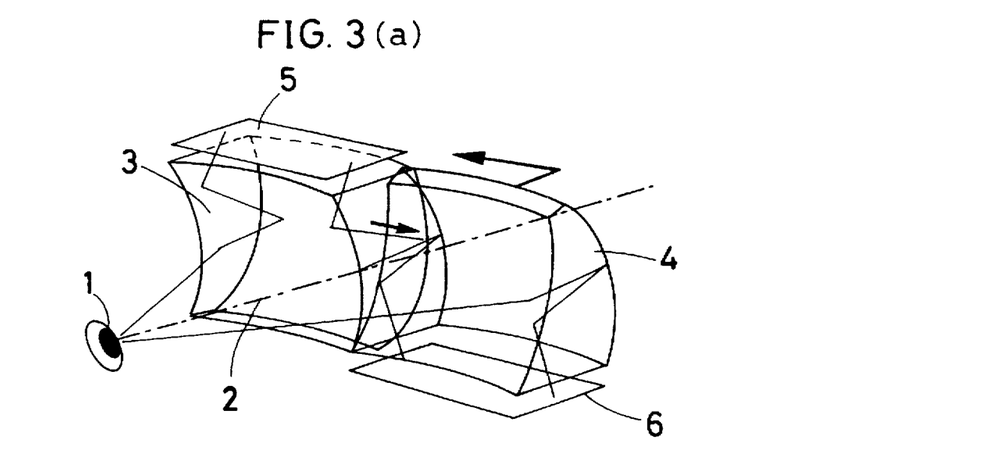
FIGS. 3(a), 3(b) and 3(c) are diagrams for describing the arrangement and operation of a third image display apparatus according to the present invention.

To observe images of the image display devices 5 and 6, as shown in FIG. 3(a), the two ocular optical systems 3 and 4 are disposed side-by-side horizontally relative to the observer, so that the two ocular optical systems 3 and 4 have no overlap area in the direction of the observer's visual axis. In this case, the first and second ocular optical systems 3 and 4 project the respective images of the image display devices 5 and 6 into the observer's eyeball with the observer's pupil 1 as an exit pupil. Therefore, the observer can view a wide image field composed of two image fields which are connected together in the horizontal direction.

Figure 3B:
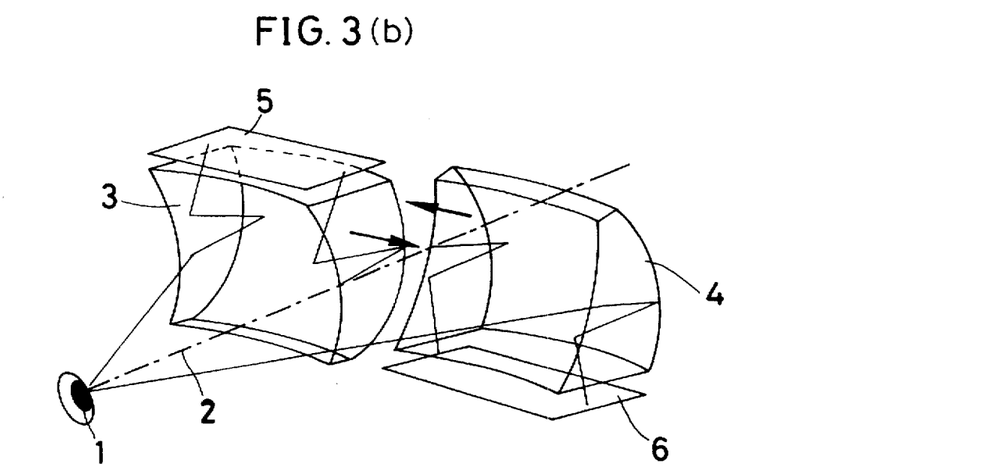
Figure 3C:
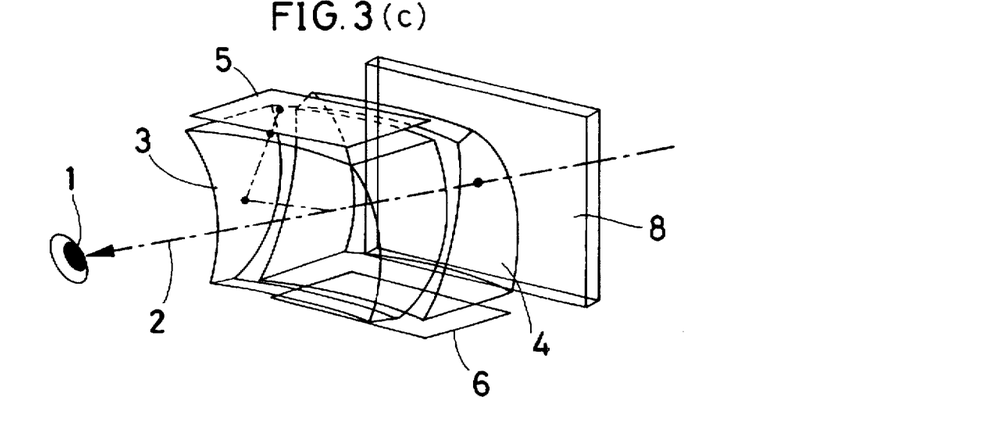

When the observer wants to view an external scene, as shown in FIG. 3(b), the two ocular optical systems 3 and 4 are moved so as to align with each other in the direction of the observer's visual axis, and as shown in FIG. 3(c), a bundle of light rays from the external scene is led to the observer's eyeball through the two ocular optical systems 3 and 4.

In the above-described arrangement, it is preferable that the composite power of the first and second ocular optical systems 3 and 4 should be approximately zero for a ray bundle entering the image display apparatus from an external scene and reaching the observer's eyeball. With this arrangement, a ray bundle from an external scene is incident on the observer's pupil 1 as a bundle of approximately parallel rays. Therefore, a clear external-scene image can be observed. Further, if the optical axis of the first ocular optical system and the observer's visual axis are coincident with each other after the ocular optical systems have been moved, the image of the first image display device can be clearly observed by displaying the image of the first image display device, with the display of the second image display device turned off. If the arrangement is such that a bundle of light rays from an external scene can enter the apparatus, an image of the external scene and an electronic image can be observed superimposed on one another. In this case, it is preferable that the image displayed on the first image display device should be different from the image displayed when two or more image display devices are used. For instance, when two image display devices are used, the first image display device displays an area accounting for the left-hand 60% of the observation image field, whereas, when the first image display device alone is used after the two ocular optical systems have been moved, the image is switched to such an image that the center of the image is coincident with the center of the image field. Thus, the center of the image can be observed to be the center of the visual field irrespective of whether the apparatus is placed in the ordinary electronic image observation mode or in the superimposition mode.

It is preferable in the third image display apparatus also that the at least two ocular optical systems should be each formed from a prism member comprising at least three surfaces tilted or decentered with respect to the observer's visual axis as in the case of the first image display apparatus. It is also preferable for the at least two image display devices to be disposed to face in respective directions different from each other. Further, it is preferable that at least one reflecting surface of each ocular optical system should be an aspherical surface, an anamorphic surface or a three-dimensional free surface. In addition, it is important to dispose a light-blocking device on the side of the two ocular optical systems which is remote from the observer in order to switch over an external-scene image and an electronic image from one to another, as in the case of the second image display apparatus.

Regarding the method of moving the two ocular optical systems 3 and 4 in the present invention from a position [first position: FIG. 3(a)] in which they are disposed side by-side horizontally relative to the observer (i.e. perpendicularly to the visual axis 2) to a position [second position: FIG. 3(c)] in which the two ocular optical systems 3 and 4 are disposed to align with each other in a direction perpendicular to the observer, the ocular optical systems 3 and 4 may be moved either by a manual operation or by electric power from a motor or the like. By way of example, a manual drive method will be described below with reference 5 to FIGS. 9 and 10.

Figure 9:
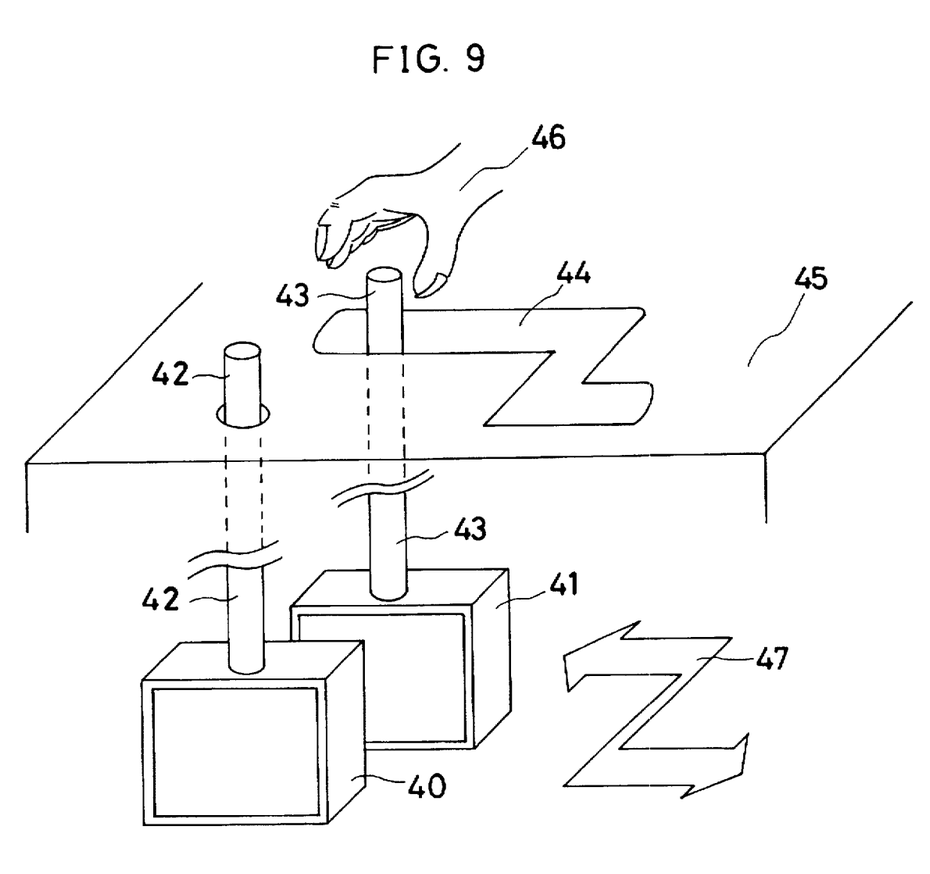
FIG. 9 is a perspective view for describing one example of a method for moving two ocular optical systems relative to each other.
Figure 10:
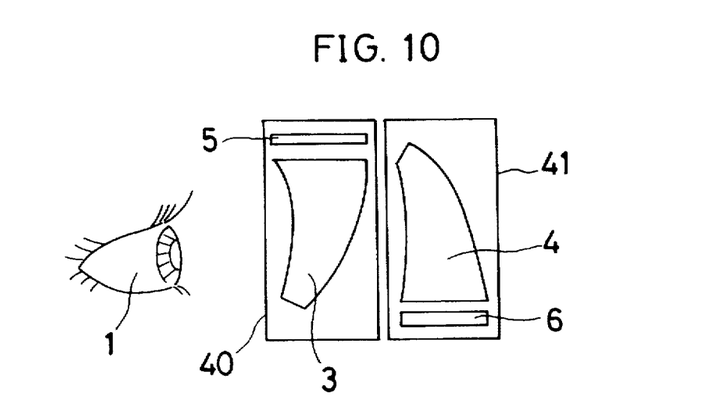
FIG. 10 is a sectional view showing two ocular optical systems which are provided with securing frames, respectively.

As shown in FIG. 10, there are provided a frame 40 for securing both the first ocular optical system 3 and the first image display device 5, and a frame 41 for securing both the second ocular optical system 4 and the second image display device 6. As shown in FIG. 9, support rods 42 and 43 are connected at respective ends thereof to the frames 40 and 41. The other end of the support rod 43 projects from a plate 45 provided with a cam groove 44. The cam groove 44 has a configuration that enables the frame 41 to move from a position (second position) where it aligns with the frame 40 to a position (first position) where the frame 41 lies side by-side with the frame 40.

Accordingly, the observer can move the two ocular optical systems 3 and 4 to any of the positions shown in FIGS. 3(a), 3(b) and 3(c) by moving the support rod 43 projecting from the cam groove 44 with his/her hand 46 as shown by the arrow 47.

Incidentally, it becomes possible for the observer to see a stable observation image by providing a device for positioning the image display devices and the ocular optical systems with respect to the observer's head.

By allowing the image display devices and the ocular optical systems to be fitted to the observer's head with a supporting device, it becomes possible for the observer to see the observation image in a desired posture and from a desired direction.

Further, it becomes possible for the observer to see the observation image with both eyes without fatigue by providing a device for supporting at least two image display apparatuses at a predetermined spacing. Moreover, if images with a disparity therebetween are displayed on the image display surfaces of the right and left image display apparatuses, and these images are observed with both eyes, it is possible to enjoy viewing a stereoscopic image.

Examples 1 to 3 of the image display apparatus according to the present invention will be described below with reference to the accompanying drawings.

Figure 4A:
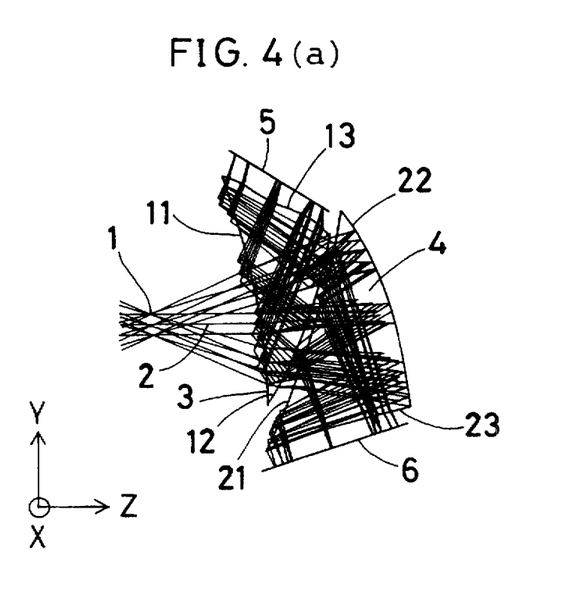
FIGS. 4(a), 4(b) and 4(c) are sectional views of an image display apparatus according to Example 1 of the present invention.
Figure 4B:
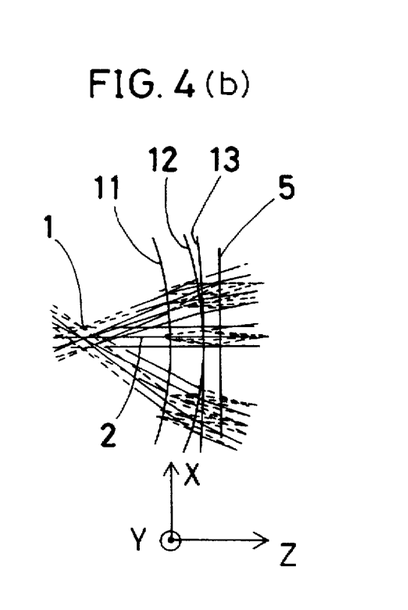
Figure 4C:
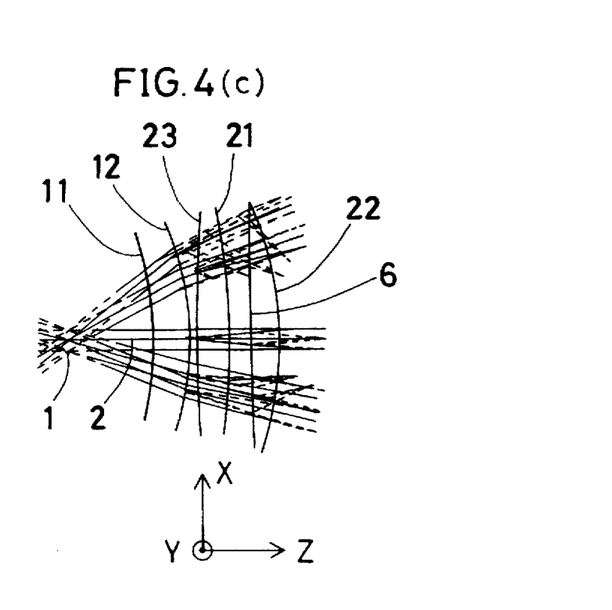

Constituent parameters of Examples 1 to 3 will be shown later. In the following description, surface Nos. are shown as ordinal numbers in backward tracing from an observer's pupil position 1 toward ocular optical systems 3 and 4. A coordinate system is defined as follows: As shown in FIGS. 4(a), 4(b) and 4(c), with the observer's iris position 1 defined as the origin, the direction of an observer's visual axis 2 is taken as a Z-axis, where the direction toward the ocular optical systems 3 and 4 from the origin is defined as a positive direction. The vertical direction (as viewed from the observer's eyeball) which perpendicularly intersects the observer's visual axis 2 is taken as a Y-axis, where the upward direction is defined as a position direction. The horizontal direction (as viewed from the observer's eyeball) which perpendicularly intersects the observer's visual axis 2 is taken as an X-axis, where the leftward direction is defined as a positive direction. That is, the plane of FIG. 4(a), described later, is defined as a YZ-plane, and a plane which is perpendicular to the plane of FIG. 4(a) is defined as an XZ-plane. Further, it is assumed that the optical axis is bent in the YZ-plane, which is parallel to the plane of FIG. 4(a).

In the constituent parameters (shown later), regarding each surface for which displacements (eccentricities) Y and Z and tilt angle e are shown, the displacement Y is a distance by which the vertex of the surface decenters in the Y-axis direction from the surface No. 1 (pupil position 1), which is a reference surface. The displacement Z is a distance by which the vertex of the surface decenters in the Z-axis direction from the surface No. 1. The tilt angle θ is the angle of inclination of the central axis of the surface from the Z-axis. In this case, positive θ means counterclockwise rotation. It should be noted that the surface separation is meaningless.

The non-rotationally symmetric aspherical configuration of each surface may be expressed in the coordinate system defining the surface as follows:

$$Z = [(X^2/R_x) + (Y^2/R_y)]/[1 + \{1 - (1+K_x)(X^2/R_x^2) - (1+K_y)(Y^2/R_y^2)\}^{1/2}] +$$
$$AR[(1-AP)X^2 + (1+AP)Y^2]^2 +$$
$$BR[(1-BP)X^2 + (1+BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

The rotationally symmetric aspherical configuration of each surface may be expressed by.

$$Z=[(h^2/R)/[1+\{1-(1+K)(h^2/R^2)\}^{1/2}]+Ah^4+Bh^6$$

where R is the paraxial curvature radius; K is the conical coefficient; A and B are 4th- and 6th-order aspherical coefficients, respectively; and h is $h^2=X^2+Y^2$.

It should be noted that the refractive index of a medium between surfaces is expressed by the refractive index for the spectral d-line. Lengths are given in millimeters.

Figure 5A:
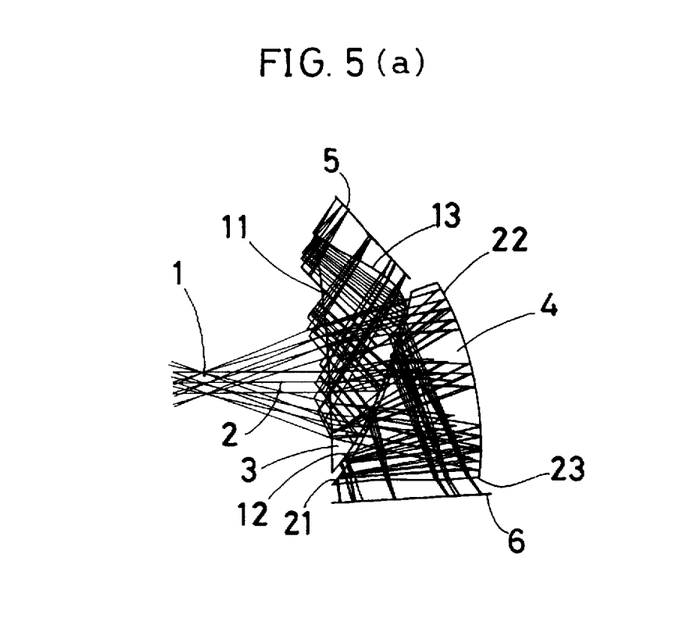
FIGS. 5(a) and 5(b) are sectional views of an image display apparatus according to Example 2 of the present invention.
Figure 5B:
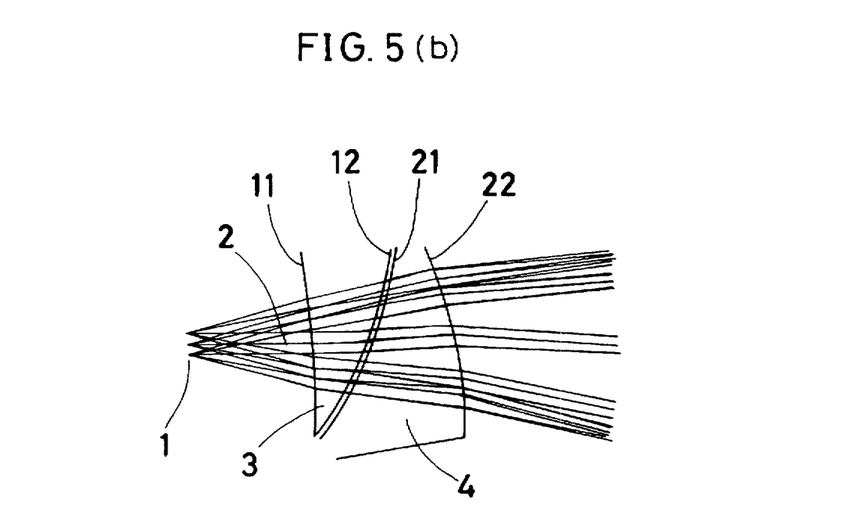
Figure 6A:
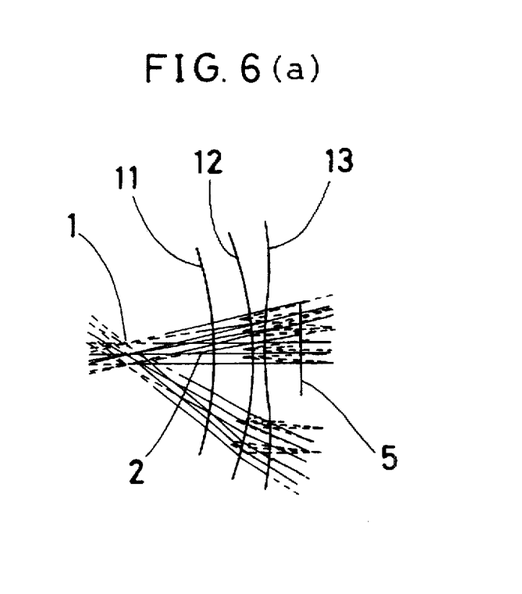
FIGS. 6(a) and 6(b) are sectional views of Example 2 in a case where images of two image display devices are observed.
Figure 6B:
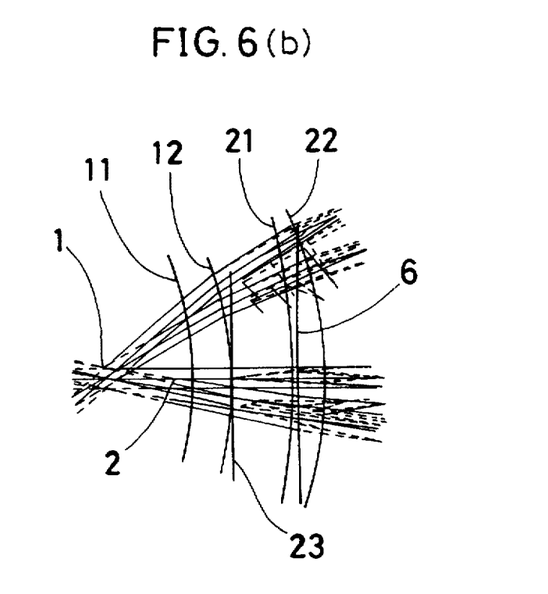
Figure 7A:
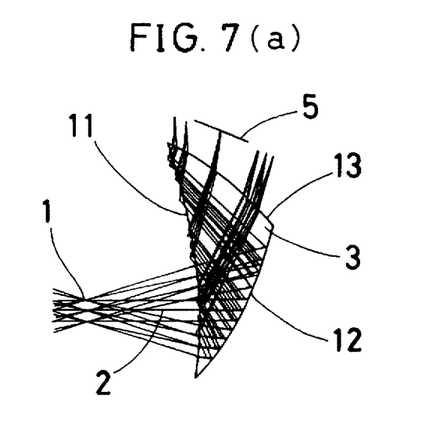
FIGS. 7(a), 7(b) and 7(c) are sectional views of an image display apparatus according to Example 3 of the present invention.
Figure 7B:
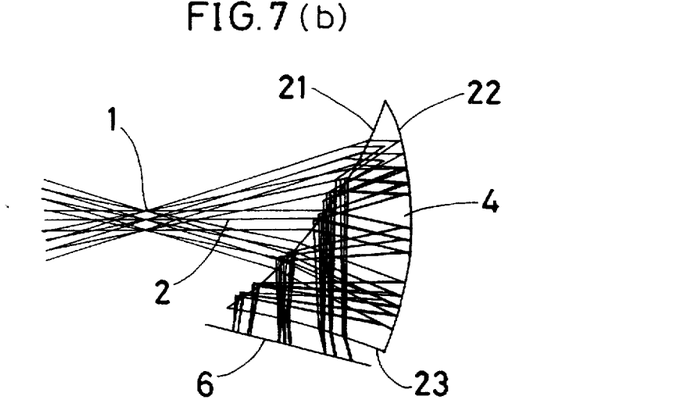
Figure 7C:
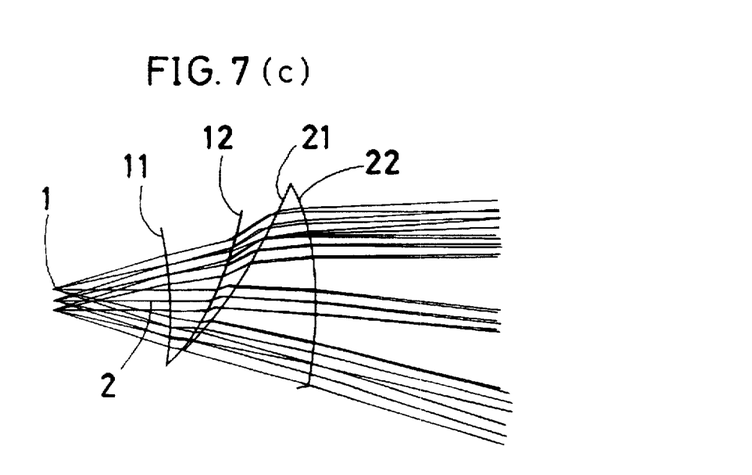

FIGS. 4(a), 4(b) and 4(c) are sectional views showing an image display apparatus designed for a single eye according to Example 1; FIGS. 5(a) to 6(b) are sectional views showing an image display apparatus designed for a single eye according to Example 2; and FIGS. 7(a), 7(b) and 7(c) are sectional views showing an image display apparatus designed for a single eye according to Example 3. In these sectional views, reference numeral 1 denotes an observer's pupil position; 2 is an observer's visual axis; 3 is a first ocular optical system; 4 is a second ocular optical system; 5 is a first image display device; 6 is a second image display device; 11 is a first surface of the first ocular optical system; 12 is a second surface of the first ocular optical system, which is a semitransparent surface; 13 is a third surface of the first ocular optical system; 21 is a first surface of the second ocular optical system; 22 is a second surface of the second ocular optical system, which is a reflecting surface or a semitransparent surface; and 23 is a third surface of the second ocular optical system.

The actual path of light rays in these examples is as follows: In Example 1, for instance, in the first ocular optical system 3 a bundle of light rays emitted from the first image display device 5 enters the first ocular optical system 3 while being refracted by the third surface 13 of the first ocular optical system 3. The incident ray bundle is internally reflected by the first surface 11 and then reflected by the second surface 12. The reflected ray bundle exits from the first ocular optical system 3 while being refracted by the first surface 11 so as to be projected into the observer's eyeball with the observer's iris position or eyeball rolling center as the exit pupil 1.

In the second ocular optical system, a bundle of light rays emitted from the second image display device 6 enters the second ocular optical system 4 while being refracted by the third surface 23 of the second ocular optical system 4. The incident ray bundle is internally reflected by the first surface 21 and then reflected by the second surface 22. The reflected ray bundle exits from the second ocular optical system 4 while being refracted by the first surface 21, and enters the first ocular optical system 3 while being refracted by the second surface 12 of the first ocular optical system 3. Then, the ray bundle exits from the first ocular optical system 3 while being refracted by the first surface 11 so as to be projected into the observer's eyeball with the observer's iris position or eyeball rolling center as the exit pupil 1.

[EXAMPLE 1]

This example corresponds to the first image display apparatus according to the present invention. FIG. 4(a) illustrates an optical ray trace in the YZ-section when the images of the image display devices 5 and 6 are observed. FIG. 4(b) illustrates an optical ray trace in the XZ-section of the first ocular optical system 3 when the image of the image display device 5 is observed. FIG. 4(c) illustrates an optical ray trace in the XZ-section of the second ocular optical system 4 when the image of the image display device 6 is observed. This example uses two image display devices 5 and 6 and two ocular optical systems 3 and 4, which are defined as a first image display device 5, a second image display device 6, a first ocular optical system 3, and a second ocular optical system 4 in order from the observer side. The exit pupil diameter of each ocular optical system is 4 mm. The set field angles of the first ocular optical system 3 are as follows: The horizontal left-hand field angle is 22.5°; the horizontal right-hand field angle is 37.5°; and the vertical field angle is 46.7°. The set field angles of the second ocular optical system 4 are as follows: The horizontal left-hand field angle is 37.5°; the horizontal right-hand field angle is 22.5°; and the vertical field angle is 46.7°. By virtue of the two images, the observation field angle becomes 75° in the horizontal direction (overlap area: 45°) and 46.7° in the vertical direction. The image area aspect ratio of each of the image display devices 5 and 6 is set at 3:4. An image field obtained when the two images are superimposed has an aspect ratio of 9:16.

[EXAMPLE 2]

This example corresponds to the second image display apparatus according to the present invention. FIG. 5(a) illustrates an optical ray trace in the YZ-section when the images of the image display devices 5 and 6 are observed. FIG. 5(b) illustrates an optical ray trace in the YZ-section when an image of an external scene is observed. FIG. 6(a) illustrates an optical ray trace in the XZ-section of the first ocular optical system 3 when the image of the image display device 5 is observed. FIG. 6(b) illustrates an optical ray trace in the XZ-section of the second ocular optical system 4 when the image of the image display device 6 is observed. This example uses two image display devices 5 and 6 and two ocular optical systems 3 and 4, which are defined as a first image display device 5, a second image display device 6, a first ocular optical system 3, and a second ocular optical system 4 in order from the observer side. The exit pupil diameter of each ocular optical system is 4 mm. The set field angles of the first ocular optical system 3 are as follows: The horizontal left-hand field angle is 13.45°; the horizontal right-hand field angle is 40°; and the vertical field angle is 41.38°. The set field angles of the second ocular optical system 4 are as follows: The horizontal left-hand field angle is 40°; the horizontal right-hand field angle is 13.45°; and the vertical field angle is 41.38°. By virtue of the two images, the observation field angle becomes 80° in the horizontal direction (overlap area: 26.9°) and 41.38° in the vertical direction. The image area aspect ratio of each of the image display devices 5 and 6 is set at 3:4. An image field obtained when the two images are superimposed has an aspect ratio of 9:20.

In actual use, as shown in FIGS. 2(a), 2(b) and 2(c), a light-blocking device 8, e.g. a liquid crystal shutter, is disposed outside the ocular optical systems 3 and 4, and half-mirrors are respectively used as the second surface 12 of the first ocular optical system 3 and the second surface 22 of the second ocular optical system 4. Under these conditions, the images of the image display devices 5 and 6 are displayed, with the light-blocking device 8 used to block the entrance of external light, thereby making it possible to observe a composite image of wide field angle displayed by the two image display devices 5 and 6. It is also possible to observe an image of an external scene by blanking the images of the image display devices 5 and 6 and placing the light-blocking device 8 in the light-transmitting mode. If the image display devices 5 and 6 are turned on to display images and the light-blocking device 8 is placed in the light-transmitting mode, the electronic image and the external-scene image can be observed superimposed on one another.

[EXAMPLE 3]

This example corresponds to the third image display apparatus according to the present invention. FIG. 7(a) illustrates an optical ray trace in the YZ-section of the first ocular optical system 3 when the image of the image display device 5 is observed. FIG. 7(b) illustrates an optical ray trace in the YZ-section of the second ocular optical system 4 when the image of the image display device 6 is observed. FIG. 7(c) illustrates an optical ray trace in the YZ-section when an image of an external scene is observed. This example uses two image display devices 5 and 6 and two ocular optical systems 3 and 4, which are defined as a first image display device 5, a second image display device 6, a first ocular optical system 3, and a second ocular optical system 4 in order from the observer side in a state where the ocular optical systems 3 and 4 have been moved relative to each other. The exit pupil diameter of each ocular optical system is 4 mm. The set field angles of the first and second ocular optical systems 3 and 4 are 45° in the horizontal direction and 34.52° in the vertical direction. By virtue of the two images, the observation field angle becomes 90° in the horizontal direction and 34.52° in the vertical direction. The two ocular optical systems 3 and 4 are disposed side-by-side horizontally relative to the observer. The image area aspect ratio of each of the image display devices 5 and 6 is set at 3:4. An image field obtained when the two images are superimposed has an aspect ratio of about 1:3.

In actual use, as shown in FIG. 3(c), a light-blocking device 8, e.g. a liquid crystal shutter, is disposed outside the ocular optical systems 3 and 4, and half-mirrors are respectively used as the second surface 12 of the first ocular optical system 3 and the second surface 22 of the second ocular optical system 4. Under these conditions, images are displayed on the image display devices 5 and 6, with the light-blocking device 8 used to block the entrance of external light, thereby making it possible to observe a composite image of wide field angle displayed by the two image display devices 5 and 6. It is also possible to observe an image of an external scene by blanking the images of the image display devices 5 and 6 and placing the light-blocking device 8 in the light-transmitting mode. If the image display devices 5 and 6 are turned on to display images and the light-blocking device 8 is placed in the light-transmitting mode, the electronic image and the external-scene image can be observed superimposed on one another.

Constituent parameters of the above-described Examples 1 to 3 are as follows:

| Sur-face No. | Radius of curvature | | Surface spepara-tion | Refractive index (Displacement) | Abbe's No. (Tilt angle) |
|---|---|---|---|---|---|
| Example 1 - first ocular optical system | | | | | |
| 1 | ∞ (pupil) | | | | |
| 2 | $R_y$ | −203.318 | | 1.4922 | 57.50 |
|   | $R_x$ | −63.325 | Y | −15.000 | θ 5.06° |
|   | $K_y$ | 14.069437 | Z | 23.433 | |
|   | $K_x$ | −0.618080 | | | |
|   | AR | $0.602211 \times 10^{-8}$ | | | |
|   | BR | $0.600654 \times 10^{-4}$ | | | |
|   | AP | $0.786276 \times 10^{1}$ | | | |
|   | BP | $-0.219167 \times 10^{2}$ | | | |
| 3 | $R_y$ | −46.766 | | 1.4922 | 57.50 |
|   | $R_x$ | −44.155 | Y | −22.538 | θ −48.51° |
|   | $K_y$ | −1.363622 | Z | 17.093 | |
|   | $K_x$ | −0.544728 | | | |
|   | AR | $0.731267 \times 10^{-8}$ | | | |
|   | BR | $-0.348254 \times 10^{-9}$ | | | |
|   | AP | $-0.643072 \times 10^{1}$ | | | |
|   | BP | $0.125660 \times 10^{-1}$ | | | |
| 4 | $R_y$ | −203.318 | | 1.4922 | 57.50 |

| Surface No. | Radius of curvature | | Surface separation | Refractive index (Displacement) | Abbe's No. (Tilt angle) |
|---|---|---|---|---|---|
| | $R_x$ | −63.325 | Y | −15.000 | θ 5.06° |
| | $K_y$ | 14.069437 | Z | 23.433 | |
| | $K_x$ | −0.618080 | | | |
| | AR | $0.602211 \times 10^{-8}$ | | | |
| | BR | $0.600654 \times 10^{-14}$ | | | |
| | AP | $0.786276 \times 10^{1}$ | | | |
| | BP | $-0.219167 \times 10^{2}$ | | | |
| 5 | $R_y$ | 24.457 | Y | 24.086 | θ 63.12° |
| | $R_x$ | −53.582 | Z | 23.763 | |
| | $K_y$ | 2.566749 | | | |
| | $K_x$ | 0 | | | |
| | AR | $-0.418986 \times 10^{-4}$ | | | |
| | BR | $-0.203721 \times 10^{-7}$ | | | |
| | AP | 0.929782 | | | |
| | BP | $0.194784 \times 10^{1}$ | | | |
| 6 | | (display device) | Y | 27.201 | θ 58.92° |
| | | | Z | 26.523 | |

Example 1 - second ocular optical system

| 1 | ∞ (pupil) | | | | |
|---|---|---|---|---|---|
| 2 | $R_y$ | −203.318 | | 1.4922 | 57.50 |
| | $R_x$ | −63.325 | Y | −15.000 | θ 5.06° |
| | $K_y$ | 14.069437 | Z | 23.433 | |
| | $K_x$ | −0.618080 | | | |
| | AR | $0.602211 \times 10^{-8}$ | | | |
| | BR | $0.600654 \times 10^{-14}$ | | | |
| | AP | $0.786276 \times 10^{1}$ | | | |
| | BP | $-0.219167 \times 10^{2}$ | | | |
| 3 | $R_y$ | −46.766 | Y | −22.538 | θ −48.51° |
| | $R_x$ | −44.155 | Z | 17.093 | |
| | $K_y$ | −1.363622 | | | |
| | $K_x$ | −0.544728 | | | |
| | AR | $0.731267 \times 10^{-9}$ | | | |
| | BR | $-0.348254 \times 10^{-9}$ | | | |
| | AP | $-0.643072 \times 10^{1}$ | | | |
| | BP | $0.125660 \times 10^{-1}$ | | | |
| 4 | $R_y$ | −138.155 | | 1.4922 | 57.50 |
| | $R_x$ | −98.368 | Y | −3.763 | θ −18.90° |
| | $K_y$ | 0 | Z | 31.508 | |
| | $K_x$ | 0 | | | |
| | AR | $0.164836 \times 10^{-5}$ | | | |
| | BR | $-0.328974 \times 10^{-9}$ | | | |
| | AP | −0.337850 | | | |
| | BP | −0.375061 | | | |
| 5 | $R_y$ | −67.244 | | 1.4922 | 57.50 |
| | $R_x$ | −63.153 | Y | 17.589 | θ 30.35° |
| | $K_y$ | 0.108357 | Z | 41.224 | |
| | $K_x$ | −0.57847 | | | |
| | AR | $0.421859 \times 10^{-6}$ | | | |
| | BR | $-0.789593 \times 10^{-10}$ | | | |
| | AP | 0.284933 | | | |
| | BP | $-0.242407 \times 10^{-1}$ | | | |
| 6 | $R_y$ | −138.155 | | 1.4922 | 57.50 |
| | $R_x$ | −98.368 | Y | −3.763 | θ −18.90° |
| | $K_y$ | 0 | Z | 31.508 | |
| | $K_x$ | 0 | | | |
| | AR | $0.164836 \times 10^{-5}$ | | | |
| | BR | $-0.328974 \times 10^{-9}$ | | | |
| | AP | −0.337850 | | | |
| | BP | −0.375061 | | | |
| 7 | | 106.761 | Y | −24.154 | θ −67.27° |
| | | | Z | 25.000 | |
| 9 | | (display device) | Y | −24.456 | θ −71.94° |
| | | | Z | 35.896 | |

Example 2 - first ocular optical system

| 1 | ∞ (pupil) | | | | |
|---|---|---|---|---|---|
| 2 | $R_y$ | −275.138 | | 1.4922 | 57.50 |
| | $R_x$ | −60.090 | Y | −14.777 | θ 0° |
| | $K_y$ | 15.022015 | Z | 25.384 | |
| | $K_x$ | −1.445549 | | | |
| | AR | $0.917884 \times 10^{-8}$ | | | |
| | BR | $0.139020 \times 10^{-12}$ | | | |
| | AP | $0.557985 \times 10^{1}$ | | | |
| | BP | $-0.105788 \times 10^{2}$ | | | |
| 3 | $R_y$ | −51.403 | | 1.4922 | 57.50 |

| Surface No. | Radius of curvature | | Surface separation | Refractive index (Displacement) | Abbe's No. (Tilt angle) |
|---|---|---|---|---|---|
| | $R_x$ | −44.032 | Y | −26.016 | θ −53.08° |
| | $K_y$ | −1.602265 | Z | 17.347 | |
| | $K_x$ | −0.675239 | | | |
| | AR | $-0.126982 \times 10^{-8}$ | | | |
| | BR | $-0.239842 \times 10^{-9}$ | | | |
| | AP | $0.612960 \times 10^{1}$ | | | |
| | BP | $-0.343498 \times 10^{-1}$ | | | |
| 4 | $R_y$ | −275.138 | | 1.4922 | 57.50 |
| | $R_x$ | −60.090 | Y | −14.777 | θ 0° |
| | $K_y$ | 15.022015 | Z | 25.384 | |
| | $K_x$ | −1.445549 | | | |
| | AR | $0.917884 \times 10^{-8}$ | | | |
| | BR | $0.139020 \times 10^{-12}$ | | | |
| | AP | $0.557985 \times 10^{1}$ | | | |
| | BP | $-0.105788 \times 10^{2}$ | | | |
| 5 | $R_y$ | 47.332 | Y | 25.381 | θ 61.16° |
| | $R_x$ | 88.501 | Z | 27.583 | |
| | $K_y$ | 7.819616 | | | |
| | $K_x$ | 1.099933 | | | |
| | AR | $-0.384408 \times 10^{-4}$ | | | |
| | BR | $-0.412788 \times 10^{-9}$ | | | |
| | AP | 0.590748 | | | |
| | BP | $-0.131359 \times 10^{1}$ | | | |
| 6 | | (display device) | Y | 27.629 | θ 42.83° |
| | | | Z | 34.581 | |

Example 2 - second ocular optical system

| 1 | ∞ (pupil) | | | | |
|---|---|---|---|---|---|
| 2 | $R_y$ | −275.138 | | 1.4922 | 57.50 |
| | $R_x$ | −60.090 | Y | −14.777 | θ 0° |
| | $K_y$ | 15.022015 | Z | 25.384 | |
| | $K_x$ | −1.445549 | | | |
| | AR | $0.917884 \times 10^{-8}$ | | | |
| | BR | $0.139020 \times 10^{-12}$ | | | |
| | AP | $0.557985 \times 10^{1}$ | | | |
| | BP | $-0.105788 \times 10^{2}$ | | | |
| 3 | $R_y$ | −51.403 | Y | −26.016 | θ −53.08° |
| | $R_x$ | −44.032 | Z | 17.347 | |
| | $K_y$ | −1.602265 | | | |
| | $K_x$ | −0.675239 | | | |
| | AR | $-0.126982 \times 10^{-8}$ | | | |
| | BR | $-0.239842 \times 10^{-9}$ | | | |
| | AP | $0.612960 \times 10^{1}$ | | | |
| | BP | $-0.343498 \times 10^{-1}$ | | | |
| 4 | $R_y$ | −54.146 | | 1.4922 | 57.50 |
| | $R_x$ | −113.535 | Y | 0.593 | θ −21.97° |
| | $K_y$ | 0 | Z | 37.326 | |
| | $K_x$ | 0 | | | |
| | AR | $0.456498 \times 10^{-5}$ | | | |
| | BR | $-0.244889 \times 10^{-8}$ | | | |
| | AP | 0.618116 | | | |
| | BP | 0.805950 | | | |
| 5 | $R_y$ | −60.241 | | 1.4922 | 57.50 |
| | $R_x$ | −66.945 | Y | 24.783 | θ 36.90° |
| | $K_y$ | 0 | Z | 43.446 | |
| | $K_x$ | 0 | | | |
| | AR | $-0.156377 \times 10^{-8}$ | | | |
| | BR | $0.124499 \times 10^{-10}$ | | | |
| | AP | $0.118074 \times 10^{2}$ | | | |
| | BP | $0.133342 \times 10^{1}$ | | | |
| 6 | $R_y$ | −54.146 | | 1.4922 | 57.50 |
| | $R_x$ | −113.535 | Y | −0.593 | θ −21.97° |
| | $K_y$ | 0 | Z | 37.326 | |
| | $K_x$ | 0 | | | |
| | AR | $0.456498 \times 10^{-5}$ | | | |
| | BR | $-0.244889 \times 10^{-8}$ | | | |
| | AP | 0.618116 | | | |
| | BP | 0.805950 | | | |
| 7 | $R_y$ | 85.685 | Y | −20.894 | θ −80.32° |
| | $R_x$ | −20.944 | Z | 25.000 | |
| | $K_y$ | 0 | | | |
| | $K_x$ | 0 | | | |
| | AR | $0.278876 \times 10^{-4}$ | | | |
| | BR | $-0.281875 \times 10^{-8}$ | | | |
| | AP | −0.883411 | | | |
| | BP | 0 | | | |

-continued

| Surface No. | Radius of curvature | Surface separation | Refractive index (Displacement) | Abbe's No. (Tilt angle) |
|---|---|---|---|---|
| 8 | (display device) | Y -23.546 | θ -87.63° |
| | | Z 38.058 | |

Example 3 - first ocular optical system

| 1 | ∞ (pupil) | | | |
| 2 | $R_y$ -87.719 | | 1.4922 | 57.50 |
| | $R_x$ -81.032 | Y -2.934 | θ 0° | |
| | $K_y$ 0 | Z 23.049 | | |
| | $K_x$ 0 | | | |
| | AR $-0.133252 \times 10^{-5}$ | | | |
| | BR $0.181740 \times 10^{-11}$ | | | |
| | AP $-0.102997 \times 10^1$ | | | |
| | BP $0.573932 \times 10^1$ | | | |
| 3 | $R_y$ -40.507 | | 1.4922 | 57.50 |
| | $R_x$ -53.091 | Y -16.956 | θ -52.97° | |
| | $K_y$ -1.512362 | Z 18.381 | | |
| | $K_x$ 1.390351 | | | |
| | AR $-0.437876 \times 10^{-7}$ | | | |
| | BR $-0.118164 \times 10^{-10}$ | | | |
| | AP $0.380140 \times 10^1$ | | | |
| | BP $-0.358216 \times 10^1$ | | | |
| 4 | $R_y$ -87.719 | | 1.4922 | 57.50 |
| | $R_x$ -81.032 | Y -2.934 | θ 0° | |
| | $K_y$ 0 | Z 23.049 | | |
| | $K_x$ 0 | | | |
| | AR $-0.133252 \times 10^{-5}$ | | | |
| | BR $0.181740 \times 10^{-11}$ | | | |
| | AP $-0.102997 \times 10^1$ | | | |
| | BP $0.573932 \times 10^1$ | | | |
| 5 | $R_y$ -68.761 | Y 30.056 | θ 59.79° | |
| | $R_x$ 45.068 | Z 21.926 | | |
| | $K_y$ 0 | | | |
| | $K_x$ 0 | | | |
| | AR $0.748368 \times 10^{-8}$ | | | |
| | BR $-0.157038 \times 10^{-7}$ | | | |
| | AP $-0.142627 \times 10^2$ | | | |
| | BP $0.100000 \times 10^{-9}$ | | | |
| 6 | (display device) | Y 35.155 | θ 69.55° | |
| | | Z 27.327 | | |

Example 3 - second ocular optical system

| 1 | ∞ (pupil) | | | |
| 2 | $R_y$ -60.023 | | 1.4922 | 57.50 |
| | $R_x$ -57.132 | Y -11.970 | θ -48.68° | |
| | $K_y$ 0 | Z 23.601 | | |
| | $K_x$ 0 | | | |
| | AR $0.152098 \times 10^{-5}$ | | | |
| | BR $0.344260 \times 10^{-10}$ | | | |
| | AP 0.151248 | | | |
| | BP $-0.217446 \times 10^1$ | | | |
| 3 | -61.296 | | 1.4922 | 57.50 |
| | | Y 43.021 | θ 46.39° | |
| | | Z 33.401 | | |
| 4 | $R_y$ -60.023 | | 1.4922 | 57.50 |
| | $R_x$ -57.132 | Y -11.970 | θ -48.68° | |
| | $K_y$ 0 | Z 23.601 | | |
| | $K_x$ 0 | | | |
| | AR $0.152098 \times 10^{-5}$ | | | |
| | BR $0.344260 \times 10^{-10}$ | | | |
| | AP 0.151248 | | | |
| | BP $-0.217446 \times 10^1$ | | | |
| 5 | 121.553 | Y -18.641 | -99.70° | |
| | | Z 20.270 | | |
| 6 | (display device) | Y -25.295 | θ 103.64° | |
| | | Z 28.397 | | |

Figure 8A:
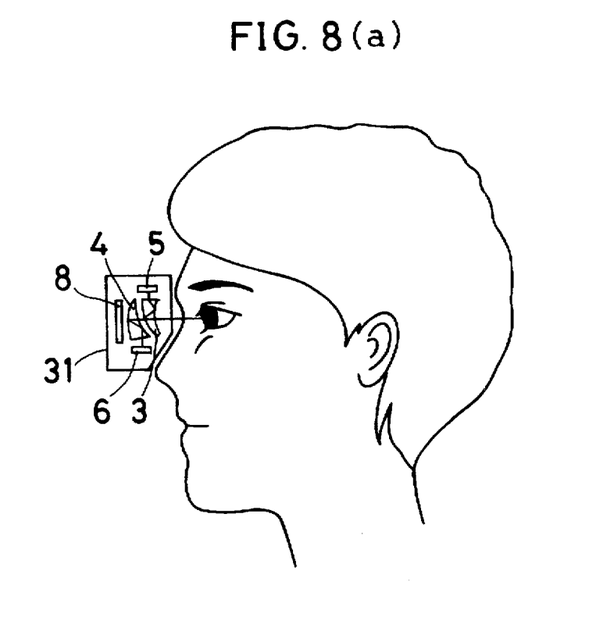
FIGS. 8(a) and 8(b) are sectional and perspective views showing a head-mounted image display apparatus according to the present invention.
Figure 8B:
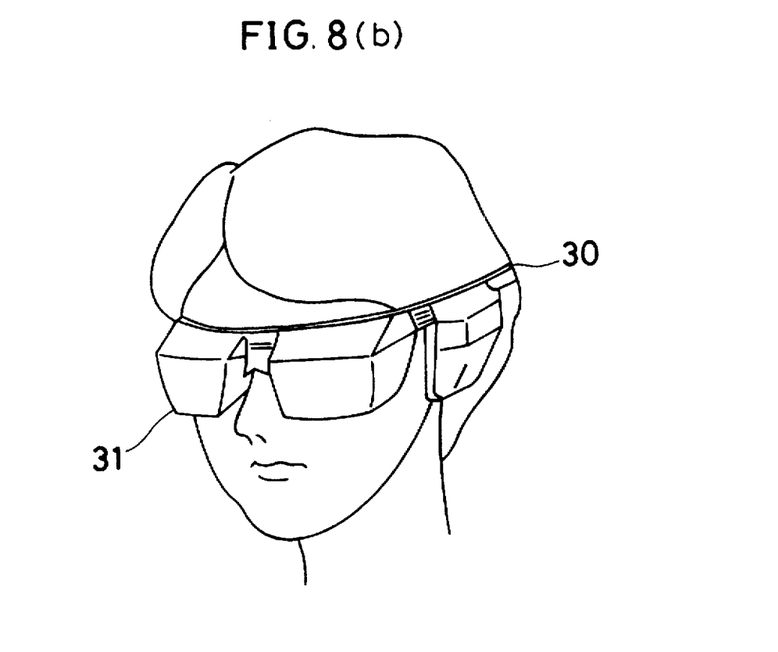

Although the image display apparatus according to the present invention has been described above by way of some examples, it should be noted that the present invention is not necessarily limited to these examples, and that various modifications may be imparted thereto. To arrange the image display apparatus according to the present invention as a head-mounted image display apparatus (HMD) 31, as shown in the sectional view of FIG. 8(a) and the perspective view of FIG. 8(b), the HMD 31 is fitted to the observer's head by using a headband 30, for example, which is attached to the HMD 31. In this case, the second image display apparatus, shown in FIGS. 2(a), 2(b) and 2(c), is used.

As will be clear from the foregoing description, it is possible according to the present invention to provide an image display apparatus which has a wide observation field angle and is small in size and light in weight.

What I claim is:

1. An image display apparatus comprising at least two image display devices for displaying images, and at least two ocular optical systems for projecting, respectively, the images formed by said at least two image display devices as enlarged virtual images in front of one common eyeball of an observer and for leading the projected images to said eyeball, wherein, when said at least two ocular optical systems are defined as a first ocular optical system and a second ocular optical system in order from an observer side, said first ocular optical system and second ocular optical system each have at least one reflecting surface of positive power, said reflecting surface being tilted or decentered with respect to an observer's visual axis, said at least one reflecting surface of positive power in said first ocular optical system being a semitransparent surface which reflects a part of incident light and transmits a part of it, said first ocular optical system being disposed on a side of said second ocular optical system which is closer to said eyeball in a direction of said observer's visual axis, said second ocular optical system being disposed on a side of said first ocular optical system which is remote from said eyeball in the direction of said observer's visual axis.

2. An image display apparatus according to claim 1, wherein said at least two ocular optical systems each include a prism member comprising at least three surfaces tilted or decentered with respect to said observer's visual axis.

3. An image display apparatus according to claim 1, wherein said at least two image display devices face in respective directions different from each other.

4. An image display apparatus according to claim 1, wherein said at least one reflecting surface is an aspherical surface.

5. An image display apparatus according to claim 4, wherein said at least one reflecting surface is an anamorphic surface.

6. An image display apparatus according to claim 4, wherein said at least one reflecting surface is a three-dimensional free surface.

7. An image display apparatus comprising at least two image display devices for displaying images, and at least two ocular optical systems for projecting, respectively, the images formed by said at least two image display devices as enlarged virtual images in front of one common eyeball of an observer and for leading the projected images to said eyeball, wherein, when said at least two ocular optical systems are defined as a first ocular optical system and a second ocular optical system in order from an observer side, said first ocular optical system and second ocular optical system each have at least one reflecting surface of positive power, said reflecting surface being tilted or decentered with respect to an observer's visual axis, said at least one reflecting surface of positive power in each ocular optical system being a semitransparent surface which reflects a part of incident light and transmits a part of it, said first ocular optical system being disposed on a side of said second ocular optical system which is closer to said eyeball in a direction of said observer's visual axis, said second ocular optical system being disposed on a side of said first ocular optical system which is remote from said eyeball in the direction of said observer's visual axis, and wherein, in a superimposition area, a bundle of light rays incident from an external scene passes successively through said second ocular optical system and said first ocular optical system to reach said observer's eyeball.

8. An image display apparatus according to claim 7, wherein, in the superimposition area, composite power of said first and second ocular optical systems is approximately zero for a bundle of light rays entering said image display apparatus from an external scene and reaching said observer's eyeball.

9. An image display apparatus according to claim 7, wherein said at least two ocular optical systems each include a prism member comprising at least three surfaces tilted or decentered with respect to said observer's visual axis.

10. An image display apparatus according to claim 7, wherein said at least two image display devices face in respective directions different from each other.

11. An image display apparatus according to claim 7, wherein said at least one reflecting surface is an aspherical surface.

12. An image display apparatus according to claim 11, wherein said at least one reflecting surface is an anamorphic surface.

13. An image display apparatus according to claim 11, wherein said at least one reflecting surface is a three-dimensional free surface.

14. An image display apparatus according to claim 7, wherein light-blocking means is disposed outside an end of said at least two ocular optical systems on a side thereof which is remote from the observer.

15. An image display apparatus comprising at least two image display devices for displaying images, and at least two ocular optical systems for projecting, respectively, the images formed by said at least two image display devices as enlarged virtual images in front of one common eyeball of an observer and for leading the projected images to said eyeball, wherein, when said at least two ocular optical systems are defined as a first ocular optical system and a second ocular optical system in order from an observer side, said first ocular optical system and second ocular optical system each have at least one reflecting surface of positive power, said reflecting surface being tilted or decentered with respect to an observer's visual axis, said at least one reflecting surface of positive power in each ocular optical system being a semitransparent surface which reflects a part of incident light and transmits a part of it, and wherein, in a first position, said first ocular optical system and second ocular optical system are disposed side-by-side in a direction perpendicular to said observer's visual axis, whereas, in a second position, said first ocular optical system is disposed on a side of said second ocular optical system which is closer to said eyeball in a direction of said observer's visual axis, and said second ocular optical system is disposed on a side of said first ocular optical system which is remote from said eyeball in the direction of said observer's visual axis, and wherein, in a superimposition area, a bundle of light rays incident from an external scene passes successively through said second ocular optical system and said first ocular optical system to reach said observer's eyeball.

16. An image display apparatus according to claim 15, wherein, when said first ocular optical system and second ocular optical system are in said second position, composite power of said first and second ocular optical systems in the superimposition area is approximately zero for a bundle of light rays entering said image display apparatus from an external scene and reaching said observer's eyeball.

17. An image display apparatus according to claim 15, wherein, when said first ocular optical system and second ocular optical system are in said second position, in the superimposition area, the image formed by said first ocular optical system is maintained, and the image formed by said second ocular optical system is blanked.

18. An image display apparatus according to claim 15, wherein said at least two ocular optical systems each include a prism member comprising at least three surfaces tilted or decentered with respect to said observer's visual axis.

19. An image display apparatus according to claim 15, wherein said at least two image display devices face in respective directions different from each other.

20. An image display apparatus according to claim 15, wherein said at least one reflecting surface is an aspherical surface.

21. An image display apparatus according to claim 20, wherein said at least one reflecting surface is an anamorphic surface.

22. An image display apparatus according to claim 20, wherein said at least one reflecting surface is a three-dimensional free surface.

23. An image display apparatus according to claim 15, wherein light-blocking means is disposed outside an end of said at least two ocular optical systems on a side thereof which is remote from the observer.

24. An image display apparatus according to any one of claims 1 to 23, further comprising means for positioning said image display devices and said ocular optical systems with respect to an observer's head.

25. An image display apparatus according to any one of claims 1 to 24, further comprising means for supporting said image display devices and said ocular optical systems with respect to an observer's head so that said image display apparatus can be fitted to said observer's head.

26. An image display apparatus according to any one of claims 1 to 25, further comprising means for supporting at least a pair of said image display apparatuses at a predetermined spacing.

* * * * *